United States Patent [19]

F'Geppert

[11] 4,449,621
[45] May 22, 1984

[54] SEGMENTED CLUTCH PLATES

[75] Inventor: Erwin F'Geppert, Oakland, Mich.

[73] Assignee: The United States of America as represented by the Secretary of the Army, Washington, D.C.

[21] Appl. No.: 292,308

[22] Filed: Aug. 12, 1981

[51] Int. Cl.³ .................. F16D 13/52; F16D 13/68
[52] U.S. Cl. ................. 192/70.13; 192/70.14; 192/107 R
[58] Field of Search .......... 192/70.13, 70.16, 70.2, 192/107 M, 70.14, 107 R; 188/71.1, 71.5, 73.2, 218 XL

[56] References Cited

U.S. PATENT DOCUMENTS

| | | | |
|---|---|---|---|
| 1,518,604 | 12/1924 | Rosner | 192/70.2 |
| 2,330,856 | 10/1943 | Adamson | 192/70.14 |
| 3,426,871 | 2/1969 | Harnish | 192/70.13 X |
| 3,482,668 | 12/1969 | Hilpert | 192/70.13 X |
| 3,491,865 | 1/1970 | Stockton | 192/70.2 X |

Primary Examiner—George H. Krizmanich
Assistant Examiner—M. Manley
Attorney, Agent, or Firm—Peter A. Taucher; John E. McRae; Robert P. Gibson

[57] ABSTRACT

A segmented annular clutch plate for use in any conventional clutch plate mechanism. The segments are of equal arcuate dimension so that they are interchangeable. Each segment possesses the same annular uniformly serrated surface. Each segment may be provided with a key-slot mating connection to restrict the radial movement of the clutch plate while in operation. The clutch plates are designed and oriented so that in the clutch assembly the plates in one set of plates have different numbers of segments than the plates in the other set of plates, whereby adjoining plates can have only two segment joints in axial alignment at any one instant.

1 Claim, 6 Drawing Figures

SEGMENTED CLUTCH PLATES

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to segmented annular clutch plates which are usable in any conventional vehicle clutch plate system that employs one series of annular clutch plates having serrated outer annular edges and which are slidably mounted to the casing of the clutch mechanism by means of splint surfaces and another series of annular clutch plates having serrated inner annular edges and slidably mounted by means of spline surfaces to input shaft and which are alternately sandwiched between the casing clutch plates. A fluid activated piston means is arranged in the casing walls to press the clutch plates together for the transmission of power from the input shaft to the casing. This invention pertains to a clutch plate which is stamped in segments and assembled for use in the above described conventional clutch plate mechanisms.

An object of this invention is to minimize scrap losses in the manufacturing process by eliminating the unused central plate area within the annulus of the clutch plate. Another object of my invention is to increase the total production per grinding cycle because there is less unused work area as the segments can be placed close together during the surface grinding operation. Another object of my invention is to reduce the scrap material occasioned by grinding bows out of the clutch plates. Another object of my invention is to allow for quick disassembly of the plates from the clutch mechanism because the housing need only be partially disassembled. Another object of my invention is to reduce the space necessary for storage of the clutch plates, as they may be more compactly stacked as compared to annular plates.

DETAILED DESCRIPTION OF THE DRAWINGS

Figure 1:
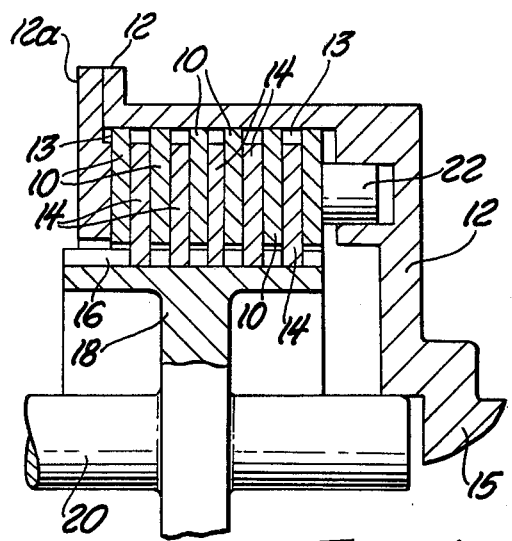
FIG. 1 depicts a cross-sectional side view of a clutch plate mechanism in which my invention may be utilized.

In the drawings, FIG. 1 depicts a series of segmented annular clutch plates 10 having outer annular serrated edges 32 slidably mounted to casing 12 by means of spline surfaces 13 carried by the casing. A second set of annular clutch plates 14 having inner annular serrated edges 33 is keyed on spline surfaces 16 to hub 18 carried by power shaft 20. Both sets of clutch plates are arranged so that they are alternately engaged; that is proceeding linearly, if at first there is a clutch plate 10, then there will be a clutch plate 14, then a clutch plate 10, and so forth in sandwich fashion.

A number of fluid activated pistons 22 are arranged along the casing to press the clutch plates together for the transmission of power from the input shaft 20 to the casing 12 and the output shaft 15.

Figure 2:
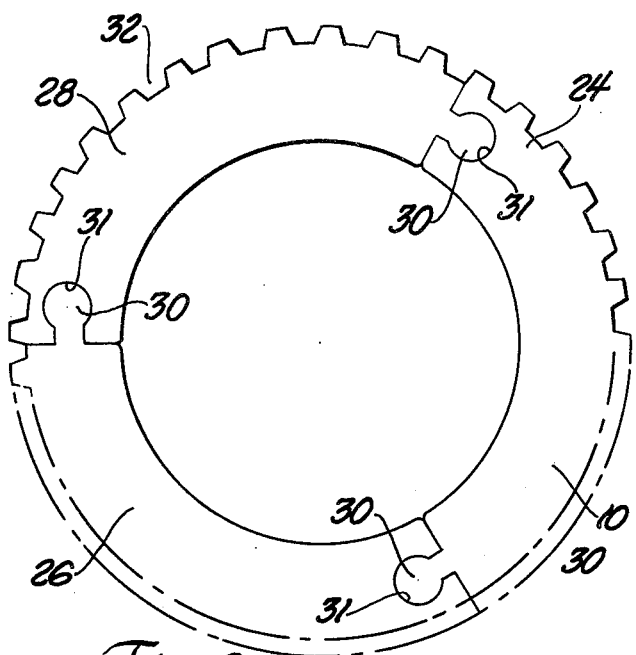
FIG. 2 is a plan view of one species of the segmented clutch plate which, when assembled, acts as a single clutch plate.
Figure 3:
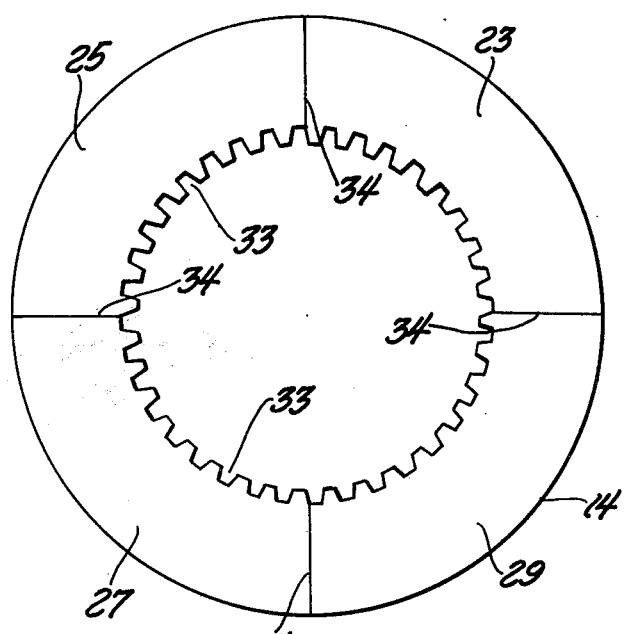
FIG. 3 is a plan view of another species of segmented clutch plate.

FIG. 2 is a plan view depicting a segmented annular clutch plate 10 with serrated outer annular edge 32. Note that the same drawing could also represent segmented annular clutch plate 14 except segmented plate 14 has an inner annular serrated edge 33 as seen in FIG. 3, instead of an outer annular serrated edge. Clutch plate 10 is comprised of plate segments 24, 26, and 28, each of equal arcuate dimension and equipped with circular key-shaped tabs 30 which lock into circular key-hole shaped notches 31 to restrict the movement of the segments radially and induce the segments to act as a single clutch plate. Clutch plate 14 may also utilize this circular tab connection. Outer annular edge serrations 32 key the segmented clutch plate into casing 12. The arcuate distance between the serrations is substantially uniform. Being uniform the serrations can more easily be keyed to the spline surfaces. Note that if the serrations were inner annular serrations 33 as seen in FIG. 3, the serrations would serve to key the clutch plate onto spline surfaces 16 of hub 18 which is carried by input shaft 20, as seen in FIG. 1.

FIG. 3 illustrates another configuration of the clutch plate embodying this invention wherein the radial edges 34 of adjacent segments 23, 25, 27 and 29 abut one another without interlocking connections between the segments. In this embodiment the segments for plate 14 are retained against circumferential dislocation by serrations 33 engaged with splines 16 (FIG. 1); the segments for plate 10 are retained against radial dislocation by the serrations 32 engaged with splines 13 on casing 12. Radial motion of the plate segments is precluded by the spline 13 surfaces.

Figure 4:
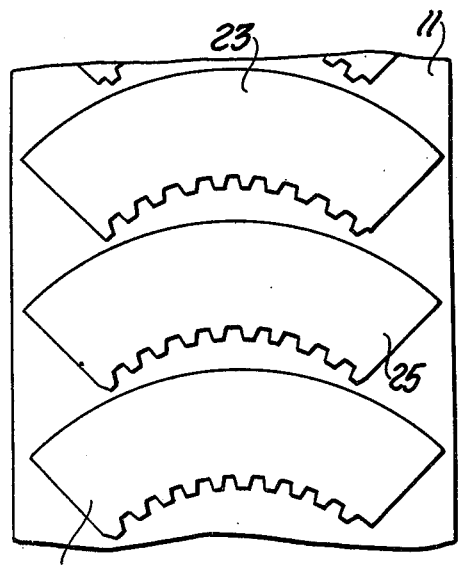
FIG. 4 illustrates how a number of annular clutch plate segments may be simultaneously stamped from a single sheet of material with a minimum of scrap.

An advantage of the FIG. 3 arrangement resides from the fact that each plate segment has a relatively small number of serrations, e.g. one-fourth the number of serrations in the complete plate. Tolerances on the forming die, sufficient to provide precision fit of all serrations on the mating spline surfaces, can be more readily attained when only a small number of serrations is involved. Each plate segment is assured of a precision fit on its splines, without binding or play. Radial edges 34 are not required to precisely engage one another or to act as load surfaces. The precision fit and/or lessened play between the serrations and splines produces a more uniform loading of all the spline surfaces, which substantially reduces localized impacts between the serrations and the spline surfaces, and thereby contributes to reduced wear and clutch plate failure. FIG. 4 illustrates that a number of clutch plate segments may be simultaneously or sequentially stamped from a sheet or strip of material that would be too small to form a conventional annular clutch plate. By arranging the various segments in close proximity to each other, an entire clutch plate may be stamped from a relatively small sheet of material, with minimum scrap and scrap handling expense.

Figure 5:
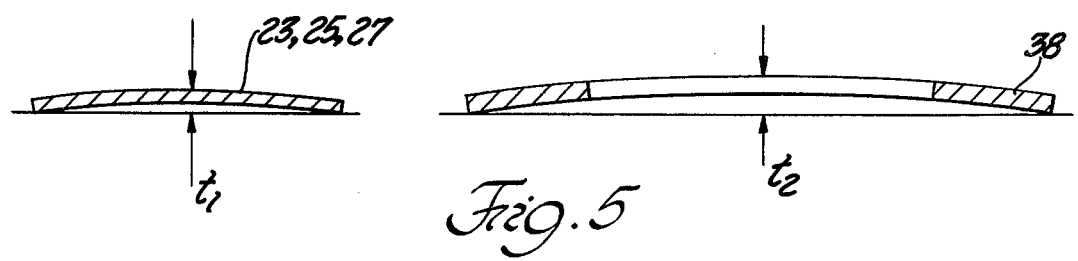
FIG. 5 illustrates the effect of bowing on clutch plate thickness.

The manufacture of clutch plates usually involves some heat treatment of the individual plates, followed by a grinding operation on both faces of each plate to remove imperfections and plate distortion (transverse bending) caused by the heat treatment. The segmented plate construction may offer some advantage during heat treatment due to its smaller size; cooling rate variations tend to be less because of the small surface area so that bending or warping of the plate may be less than that experienced by a conventional annular plate. Even assuming the same warp or bow angle, the plate segment will have some advantage due to lesser grinding requirement. Thus, FIG. 5 shows that a bowed plate segment 23, 25, 27, etc will have a lesser thickness $t_1$ than the thickness $t_2$ of a complete one piece annular plate 38 having the same bow angle. Due to its lesser thickness, each bowed plate segment requires lesser grinding to produce smooth, parallel flat faces, as compared to annular plate 38. To attain a given final plate thickness the segments can be initially formed from thinner stock than the corresponding annular plate 38. Additionally, the plate segments having certain packing advantages that allow more segments to be positioned on a given size grinding table. For example, four plate segments 23, 25, 27 etc. would, in a typical case, occupy only about two thirds the table area occupied by a single annular plate of the same clutch surface area. The packing advantage is due to the absence of the large central hole in the one piece plate. The capability for positioning a great number of plate segments on a given size grinding table translates into higher production rate and lower unit cost; there is one disadvantage in the segmented plate design resulting from the fact that a greater number of pieces must be handled.

The segmented clutch plate design may have some advantage as regards smaller storage space requirement in the shipping container, warehouse, depot or parts supply outlet. Finally, the segmented clutch plates embodied in this invention may enhance quick disassembly of the clutch plate mechanism from the housing structure need only be partially disassembled to remove or replace the segmented clutch plates. As seen in FIG. 1, when wall 12a is removed from the casing 12 proper the segmented plates can be slid to the left and individually separated from the casing and hub 18 by radial movements; there is no need to disturb shafts 20 and 15. The prior art one piece annular clutch plates can be removed and/or replaced in most cases only after removal of one or both shafts.

The drawings show each clutch plate to be formed from three or four clutch plate segments. The plate can be segmented into a greater number of individual segments, but no special advantage is seen in a greater number. Two segments is not satisfactory because it is then not possible to install or remove the plate segments on the mating splines due to tooth interference effects. The number of plate segments for plates 10 can be different than the number of plate segments for plates 14 to preclude the segment joints in plates 10 from contacting the segment joints in plates 14.

Figure 6:
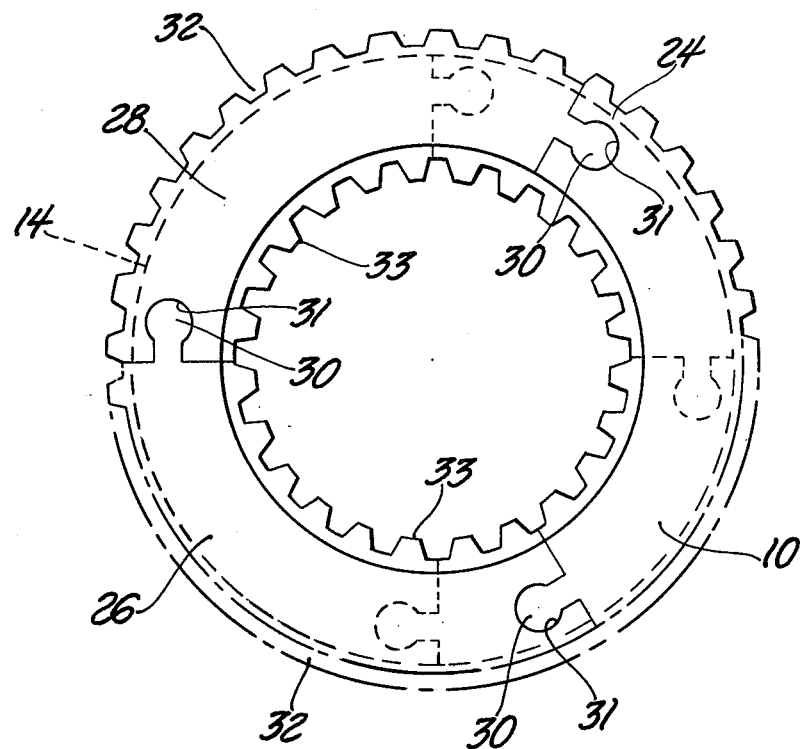
FIG. 6 is a view similar to FIG. 2 but illustrating an embodiment of the invention wherein certain clutch plates are comprised of three plate segments, and other clutch plates are comprised of four plate segments.

FIG. 6 illustrates the above-mentioned advantage. Plate 10 comprises three plate segments of identical size and configuration, whereas plate 14 (directly behind plate 10) comprises four plate segments of identical size and configuration. As shown, only one segment joint in plate 10 is aligned with one segment joint in plate 14. Irrespective of the relative rotational speeds of the respective clutch plates, only one segment joint on plate 10 can align with a segment joint on plate 14 at any one instant. By thus minimizing the number of segment joints that can be in alignment at any one time it is possible to reduce the number of segment joints in edge-to-edge contact. Minimization of such contacts causes the plates to act more nearly as single piece plates (while still having the segmentation advantages).

I wish it to be understood that I do not desire to be limited to the exact details of construction shown and described for obvious modifications will occur to a person skilled in the art.

I claim:

1. A rotary disk clutch assembly comprising a first set of annular clutch plates equipped with serrated outer edges to engage splines on a rotary casing, and a second set of annular clutch plates equipped with serrated inner edges to engage splines on a rotary hub concentric with the casing, individual plates in the first set being interposed between individual plates in the second set to form frictional drive connections between the casing and hub;

each clutch plate in said first set of clutch plates being formed of at least three plate segments of identical size and configuration; each clutch plate in said second set of clutch plates being formed of at least three plate segments of identical size and configuration;

the number of plate segments in individual plates of the first set being different than the number of plate segments in the individual plates of the second set, whereby the facing surfaces of any two adjacent clutch plates can have a maximum of only two segment joints in axial alignment with one another at any one instant;

each of said clutch plate segments in the first and second sets of plates having a key-shaped tab at one end and a keyhole-shaped notch of the same size and shape at its other end, said tabs and notches extending entirely through each associated plate segment for the full plate segment thickness, the arrangement being such that the tab of one segment locks into the notch of an adjacent segment to form a rigid unitary clutch plate wherein the segments are precluded from separation in axial, radial or circumferential directions;

the clutch plates in said first set of plates having their faces directly exposed to the faces of adjacent plates in said second set of plates whereby the application of an axial operating force on the disk clutch assembly causes adjacent clutch plate faces to have frictional engagement with one another.

* * * * *